US012504228B2

(12) United States Patent
Leak

(10) Patent No.: US 12,504,228 B2
(45) Date of Patent: Dec. 23, 2025

(54) WEAVE, WIG, AND HAIR EXTENSION DRYER

(71) Applicant: Maysa Leak, Pikesville, MD (US)

(72) Inventor: Maysa Leak, Pikesville, MD (US)

( * ) Notice: Subject to any disclaimer, the term of this patent is extended or adjusted under 35 U.S.C. 154(b) by 762 days.

(21) Appl. No.: 17/930,525

(22) Filed: Sep. 8, 2022

(65) Prior Publication Data

US 2024/0085109 A1 Mar. 14, 2024

(51) Int. Cl.

| | |
|---|---|
| ***F26B 9/06*** | (2006.01) |
| ***A41G 5/00*** | (2006.01) |
| ***F26B 21/00*** | (2006.01) |
| ***F26B 21/06*** | (2006.01) |

(52) U.S. Cl.

CPC ................ *F26B 9/06* (2013.01); *A41G 5/004* (2013.01); *F26B 21/001* (2013.01); *F26B 21/06* (2013.01)

(58) Field of Classification Search

CPC .......... F26B 9/06; F26B 21/001; F26B 21/06; A41G 5/004

USPC ........................................................ 34/195

See application file for complete search history.

(56) References Cited

U.S. PATENT DOCUMENTS 1,515,431 A * 11/1924 Forrest ...................... F26B 9/06 34/191
3,298,113 A * 1/1967 Friedman ................ F16B 21/02 219/400
3,327,404 A * 6/1967 Ganier ...................... F26B 9/06 34/223
3,828,588 A * 8/1974 Duncan .................. A45D 44/14 34/103
5,555,640 A * 9/1996 Ou ........................ F26B 25/066 312/249.9
5,755,040 A * 5/1998 Ou .......................... D06F 58/10 34/225
6,757,986 B2 7/2004 Miller et al.
8,713,814 B2 * 5/2014 Martin .................. A47K 3/281 392/382
9,072,359 B2 7/2015 Agoro
9,462,868 B2 10/2016 Kim
9,788,629 B2 10/2017 Blum
9,826,812 B2 * 11/2017 Sterling ................ A45D 44/02
9,901,223 B2 * 2/2018 Ricketts ................ A47K 10/48

(Continued)

FOREIGN PATENT DOCUMENTS

GB 1378191 A * 12/1974 ................ F26B 9/06
KR 102478165 B1 * 12/2022 .............. F26B 15/18

*Primary Examiner* — Stephen M Gravini

(74) *Attorney, Agent, or Firm* — Dunlap Bennett & Ludwig PLLC; Anna L. Kinney

(57) ABSTRACT

A drying cabinet has a housing; a door; a carousel drying rack rotatably mounted within the housing; a heat protecting cap; a heating element; a blower mounted in a diagonal configuration; and a controller. The housing includes a top surface with a hole, a base, a front wall with a loading opening, a rear wall, and two sidewalls, forming an inner chamber. The door is hingedly mounted to the front wall, to close the loading opening. The drying rack is a ring having an upper surface, a lower surface, a perimeter, and suspension appendages extending from the lower surface. The cap has a handle and is removably mounted within the top hole. The controller is mounted within one of the sidewalls and has a user interface to selectively operate the heating element and/or the blower. The blower outputs air at a predetermined angle to spin the hair while drying it.

11 Claims, 4 Drawing Sheets

(56) References Cited

U.S. PATENT DOCUMENTS

| | | | | |
|---|---|---|---|---|
| 10,006,707 | B1 | 6/2018 | Wiley et al. | |
| 10,234,196 | B2 | 3/2019 | McCloud | |
| 10,433,628 | B2 | 10/2019 | Palmer | |
| 10,492,591 | B2 | 12/2019 | Girod | |
| 11,229,269 | B2 * | 1/2022 | Tucker | A45D 20/12 |
| 11,510,471 | B2 * | 11/2022 | Kuzia | A45D 20/12 |
| 2003/0111877 | A1 | 6/2003 | Collins et al. | |
| 2016/0219957 | A1 | 8/2016 | Dodds | |
| 2019/0166969 | A1 * | 6/2019 | Brownlee | A45D 20/12 |
| 2019/0285344 | A1 | 9/2019 | Hammond et al. | |
| 2020/0107623 | A1 | 4/2020 | Tucker | |
| 2021/0267340 | A1 | 9/2021 | Grimes | |
| 2024/0085109 | A1 * | 3/2024 | Leak | F26B 15/06 |

* cited by examiner

WEAVE, WIG, AND HAIR EXTENSION DRYER

BACKGROUND OF THE INVENTION

The present invention relates to hair dryers and, more particularly, to a weave, wig, and hair extension dryer.

Hand dryers take time to dry weaves, wigs, and hair extensions and someone must physically attend to them, taking time away from working with customers and adding to a stylist's workload.

As can be seen, there is a need for an efficient, unattended, weave, wig, and hair extension dryer.

SUMMARY OF THE INVENTION

In one aspect of the present invention, a drying cabinet comprises a housing having a top surface with a top surface aperture, a base, a front wall with a loading aperture, a rear wall, and two sidewalls, forming an inner chamber; a door hingedly mounted to the front wall, operative to close the loading aperture; a first carousel drying rack rotatably mounted within the housing, configured as a ring having an upper surface, a lower surface, a perimeter, and suspension appendages extending from the lower surface; a heat protecting cap having a handle, removably mounted within the top surface aperture; a heating element mounted to the inner chamber; a blower mounted to the inner chamber in a diagonal configuration, said blower adapted to output air at a predetermined angle; and a controller, having a user interface, mounted within one of the two sidewalls, configured to selectively operate at least one of the heating element and the blower.

In another aspect of the present invention, a drying cabinet comprises a housing having a top surface, a base, a front wall with a loading aperture, a rear wall, and two sidewalls, forming an inner chamber; a door hingedly mounted to the front wall, operative to close the loading aperture; a first shelf slidably mounted within the inner chamber; a second shelf slidably mounted within the inner chamber spaced from the first shelf; a first drying compartment coupled to the first shelf having a first aperture in a first upper surface thereof; a first carousel drying rack rotatably mounted within the first drying compartment, having a first lower surface, a first perimeter, and suspension appendages extending from the first lower surface; a first heat protecting cap having a first handle, removably mounted within the first aperture; a first blower mounted to the first drying compartment in a diagonal configuration, said first blower adapted to output air at a first predetermined angle; a second drying compartment coupled to the second shelf having a second aperture in a second upper surface thereof; a second carousel drying rack rotatably mounted within the second drying compartment, having a second lower surface, a second perimeter, and suspension appendages extending from the second lower surface; a second heat protecting cap having a second handle, removably mounted within the second aperture; second blower mounted diagonally to the second drying compartment, said second blower adapted to output air at a second predetermined angle; and a controller, having a user interface, mounted within one of the two sidewalls, configured to selectively operate at least one of the first blower and the second blower.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a weave, wig, and hair extension dryer that rotatably suspends the hair within a cabinet while blowing it dry.

The inventive dryer is sometimes referred to herein as the "AIR DRYER". It is a self-contained unit comprising blowers that spin the hair while drying it efficiently in a fraction of the time taken with a prior art hand dryer. The dryer is advantageous to hair stylists as it may save time for their customers, increase their efficiency, and lessen their workload.

The drying cabinet is accessible via a door and houses a carousel drying rack (which may be referred to as a spindle), at least one heating element, and blowers (i.e., blow dryers) configured to cause a vortex. The diagonal configuration spins the hair suspended from the carousel drying rack in the heated cabinet to provide a drying system that is faster than using a commercially available handheld hair blow dryer. The dryer has a controller with a user interface and a timer, enabling use of the dryer unattended.

The inventive dryer may be manufactured by producing a cabinet with a door and installing two blowers diagonally—one at a top left, one at a bottom right. The blowers are adapted to output air at a predetermined angle. An oscillating or rotating carousel drying rack has a perimeter and a lower surface with suspension appendages such as clips, hooks, or the like to secure hair. The carousel drying rack may be installed at the top of the cabinet. A door of the cabinet keeps the contents contained and keeps the heat in. A controller having a timed switch may be electrically connected to, and may selectively operate (e.g., start and shut down), a heating element and the two blowers. The timer is operative to shut down the unit after a preselected time. An electrical cord may be electrically connected to the controller to provide power.

To use the dryer, a user may plug in the electrical cord, open the door to access a loading aperture, and attach wet hair or hair-like filament to the clips on the carousel drying rack. The user may close the door, turn the unit on, and set the timer. The blowers spin and dry the hair. When the timer shuts the dryer off, i.e., automatically disengages operation of the heating element(s), the blower(s), or both, the user may open the door, remove the dried hair or remove the carousel drying rack with the dried hair, close the door, and turn the unit off.

Figure 1:
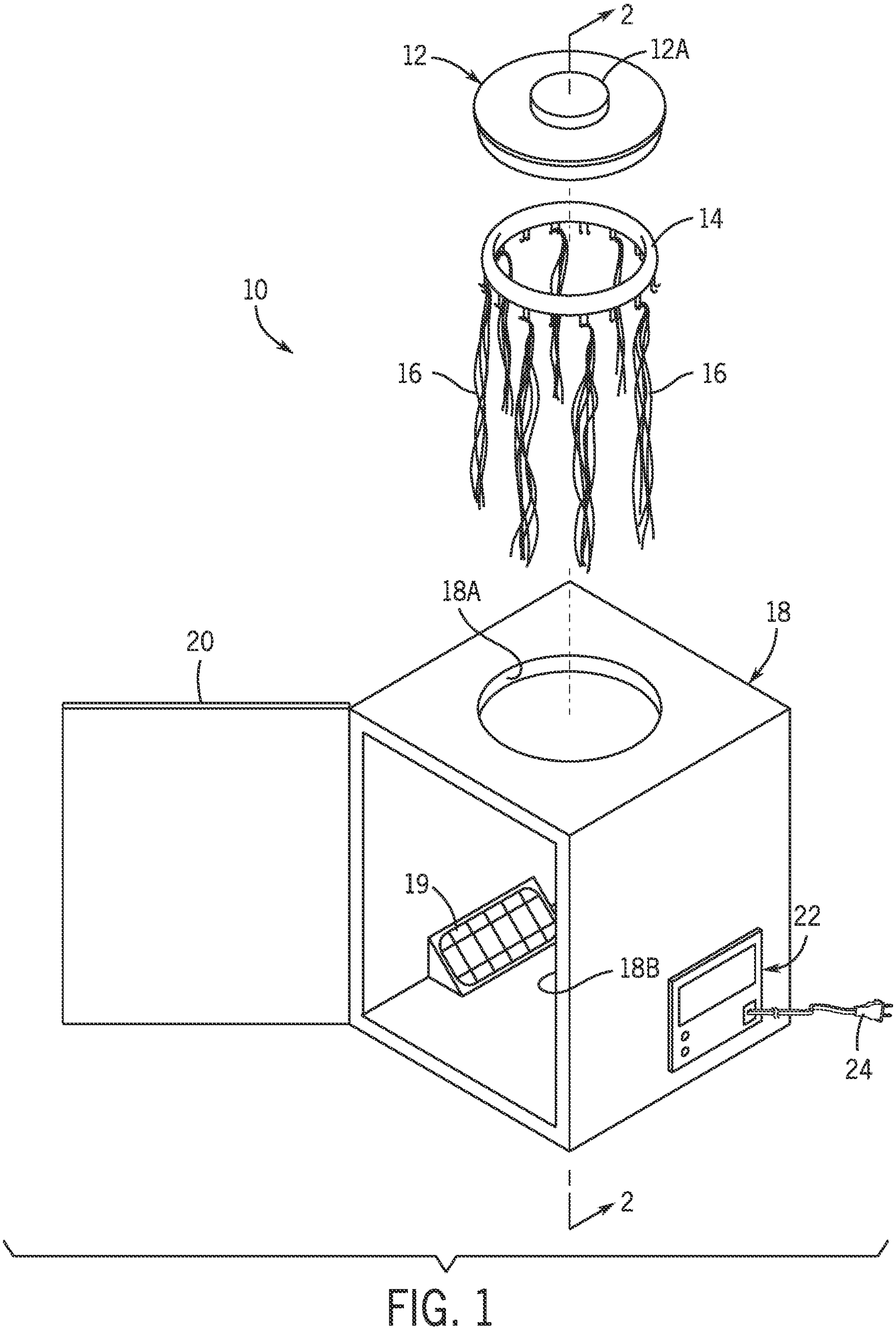
FIG. 1 is an exploded perspective view of a weave, hair extension, and wig dryer according to an embodiment of the present invention.
Figure 2:
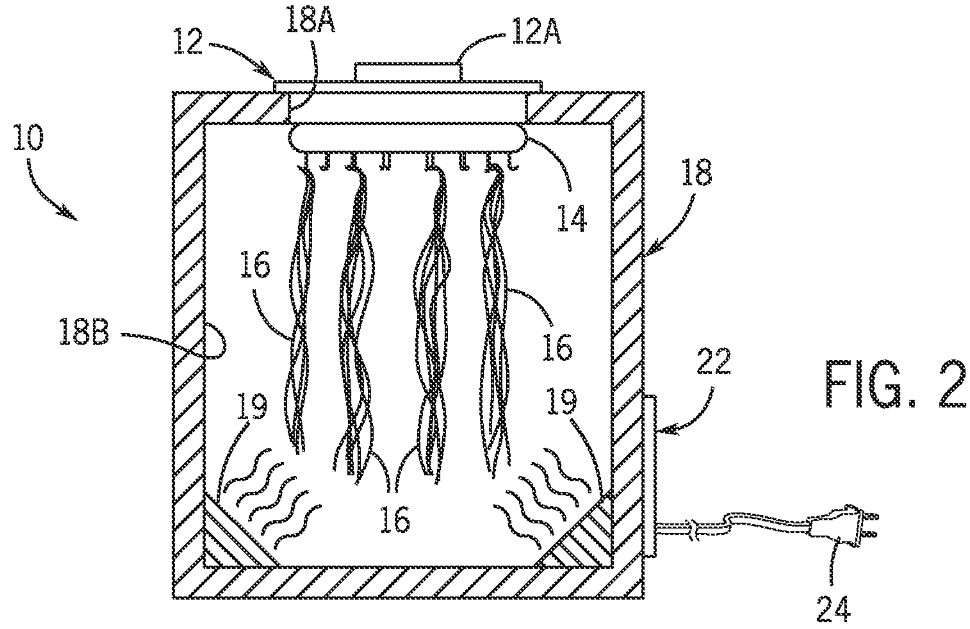
FIG. 2 is a cross-sectional view thereof, taken along line 2-2 of FIG. 1.

Referring to FIGS. 1 through 5, FIGS. 1 and 2 illustrate a weave, hair extension, and wig dryer 10 comprising a dryer cabinet 18 having a door 20 hingedly mounted to the cabinet and defining an interior or inner chamber 18B. The cabinet 18 includes a housing having a base, a front wall, a rear wall, two sidewalls, and a top surface. A rotating disc or carousel rack 14 rests within an aperture 18A in the top surface of the cabinet 18. The aperture 18A is sealed with a removable heat protecting cap 12 having a handle 12A. While not being limited to the illustrated position, blowers or fans 19 at a base of the interior direct airflow in a vortex pattern, driving the rotating disc 14 in a circular motion. A plug 24 and a control panel 22 on an exterior of the cabinet 18 enable the user to power and program the apparatus. The FIG. 1 illustrates placement of hair extensions 16 on the carousel rack 14 prior to use.

Figure 3:
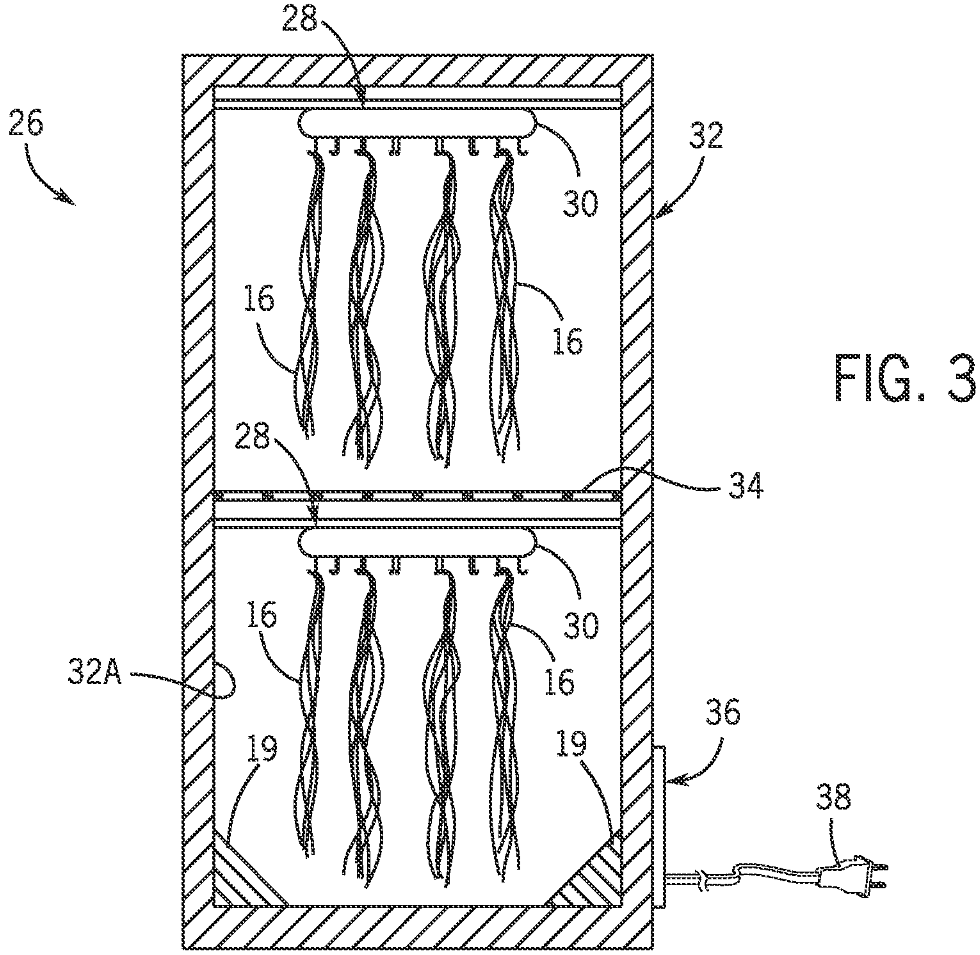
FIG. 3 is a cross-sectional view of a dryer according to another embodiment of the present invention.

FIG. 3 illustrates a dryer 26 according to another embodiment of the present invention, having a divided cabinet dryer 32, providing two oscillatory or rotational units 28 supporting rotating discs or carousel racks 30 stacked within the interior 32A. A mesh shelf 34 positioned horizontally midway along the interior 32A height separates an upper (or first) drying zone from a lower (or second) drying zone, while allowing air passage therethrough. A plug 38 and a control panel 36 are provided to power and program the apparatus.

Figure 4:
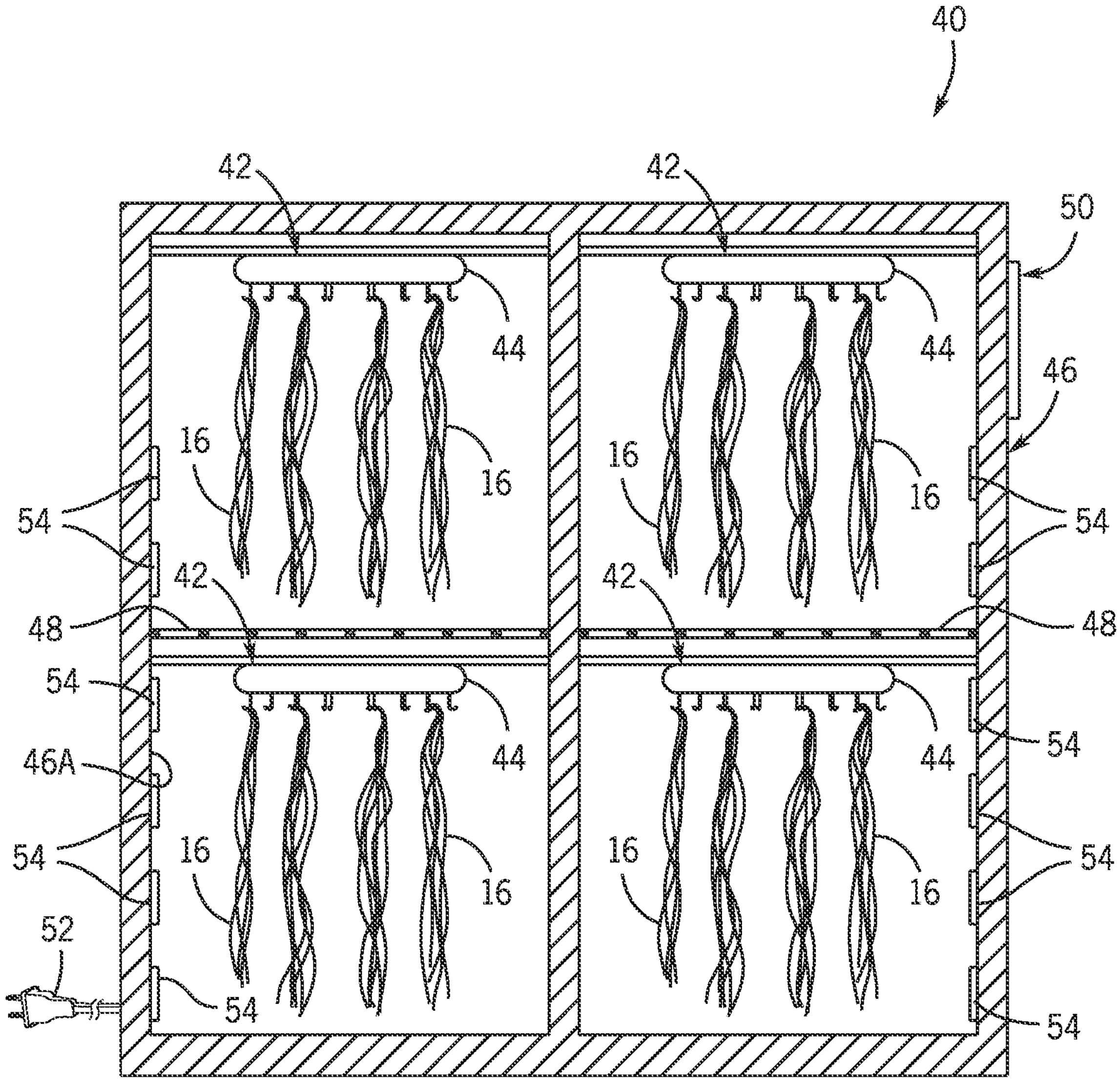
FIG. 4 is a cross-sectional view of a dryer according to another embodiment of the present invention.

A dryer 40 according to a third embodiment of the present invention is shown in FIG. 4. The cabinet 46 interior 46A is divided into four sectors, each having heating elements 54 and an oscillatory supporting unit 42 supporting a rotating disc or carousel rack 44. An air-permeable vertical wall joins the top surface and the base of the housing and separates the left sectors from the laterally adjacent right sectors. Mesh shelves 48 separate the upper sectors from the lower sectors while allowing air passage therethrough. A plug 52 and a control panel 50 are provided to power and program the apparatus.

Figure 5:
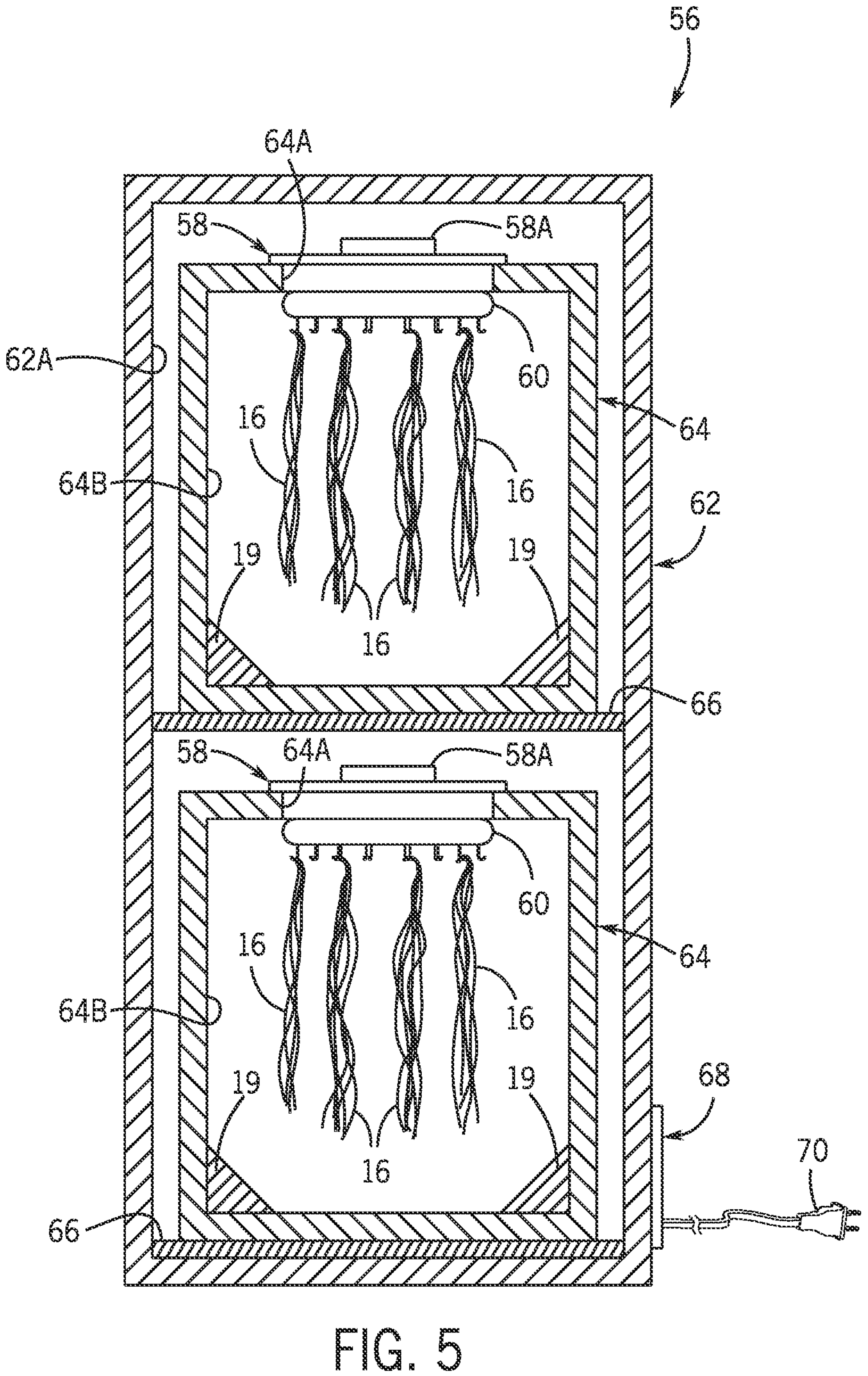
FIG. 5 is a cross-sectional view of a dryer according to another embodiment of the present invention.

FIG. 5 illustrates a dryer 56 according to a fourth embodiment of the present invention. The dryer cabinet 62 interior 64B holds two hair vaults or drying compartments 64 mounted to pull-out racks or slidable shelves 66, in a stacked configuration. Each vault 64 has a rotating disc 60 resting within an aperture 64A covered by heat protecting cap 58 with a handle 58A. The vaults 64 are spaced from the walls of the dryer cabinet 62, forming an airspace operative to circulate airflow through the interior 64B. A plug 70 and a control panel 68 are provided to power and program the apparatus.

It should be understood, of course, that the foregoing relates to exemplary embodiments of the invention and that modifications may be made without departing from the spirit and scope of the invention as set forth in the following claims.

What is claimed is:

1. A drying cabinet, comprising:

a. A housing having a top surface with a top surface aperture, a base, a front wall with a loading aperture, a rear wall, and two sidewalls, forming an inner chamber;

b. a door hingedly mounted to the front wall, operative to close the loading aperture;

c. a first carousel drying rack rotatably mounted within the housing, configured as a ring having an upper surface, a lower surface, a perimeter, and suspension appendages extending from the lower surface;

d. a heat protecting cap having a handle, removably mounted within the top surface aperture;

e. a heating element mounted to the inner chamber;

f. a blower mounted to the inner chamber in a diagonal configuration, said blower adapted to output air at a predetermined angle; and g. a controller, having a user interface, mounted within one of the two sidewalls, configured to selectively operate at least one of the heating element and the blower.

2. The drying cabinet of claim 1, wherein the controller further comprises a timer operative to automatically disengage operation of the at least one of the heating element and the blower after a preselected time set on the timer.

3. The drying cabinet of claim 1, further comprising an electrical cord electrically connected to the controller, the heating element, and the blower.

4. The drying cabinet of claim 1, further comprising:

a. a mesh shelf mounted horizontally within the housing to form a first drying zone above the mesh shelf and a second drying zone below the mesh shelf; and b. a second carousel drying rack rotatably mounted within the housing, such that the first carousel drying rack is mounted within the first drying zone and the second carousel drying rack is mounted within the second drying zone.

5. The drying cabinet of claim 4, further comprising a first supporting unit coupling the first carousel drying rack to the housing within the first drying zone and a second supporting unit coupling the second carousel drying rack to the housing within the second drying zone.

6. The drying cabinet of claim 1, further comprising:

a. an air-permeable vertical wall joining the top surface and the base of the housing to form a first compartment laterally adjacent to a second compartment;

b. a first mesh shelf mounted horizontally within the first compartment to form a first drying zone above the first mesh shelf and a second drying zone below the first mesh shelf;

c. a second mesh shelf mounted horizontally within the second compartment to form a third drying zone above the first mesh shelf and a fourth drying zone below the first mesh shelf; and d. a second carousel drying rack rotatably mounted within the second drying zone; a third carousel drying rack rotatably mounted within the third drying zone, and a fourth carousel drying rack rotatably mounted within the fourth drying zone, wherein the first carousel drying rack is rotatably mounted within the first drying zone.

7. The drying cabinet of claim 6, further comprising a first supporting unit coupling the first carousel drying rack to the housing within the first drying zone; a second supporting unit coupling the second carousel drying rack to the housing within the second drying zone; a third supporting unit coupling the third carousel drying rack to the housing within the third drying zone; and a fourth supporting unit coupling the fourth carousel drying rack to the housing within the fourth drying zone.

8. A drying cabinet, comprising:

a. A housing having a top surface, a base, a front wall with a loading aperture, a rear wall, and two sidewalls, forming an inner chamber;

b. a door hingedly mounted to the front wall, operative to close the loading aperture;

c. a first shelf slidably mounted within the inner chamber;

d. a second shelf slidably mounted within the inner chamber spaced from the first shelf;

e. a first drying compartment coupled to the first shelf having a first aperture in a first upper surface thereof; a first carousel drying rack rotatably mounted within the first drying compartment, having a first lower surface, a first perimeter, and suspension appendages extending from the first lower surface;

f. a first heat protecting cap having a first handle, removably mounted within the first aperture;

g. a first blower mounted to the first drying compartment in a diagonal configuration, said first blower adapted to output air at a first predetermined angle;

h. a second drying compartment coupled to the second shelf having a second aperture in a second upper surface thereof; a second carousel drying rack rotatably mounted within the second drying compartment, having a second lower surface, a second perimeter, and suspension appendages extending from the second lower surface;

i. a second heat protecting cap having a second handle, removably mounted within the second aperture;

j. a second blower mounted diagonally to the second drying compartment, said second blower adapted to output air at a second predetermined angle; and k. a controller, having a user interface, mounted within one of the two sidewalls, configured to selectively operate at least one of the first blower and the second blower.

9. The drying cabinet of claim 8, wherein the first blower comprises a first heating element and the second blower comprises a second heating element.

10. The drying cabinet of claim 8, wherein the first drying compartment and the second drying compartment have a stacked configuration.

11. The drying cabinet of claim 8, wherein the first drying compartment and the second drying compartment are spaced from the top surface and the two sidewalls to form an airspace operative to circulate airflow through the inner chamber.

* * * * *